US00RE38724E

(19) United States
(12) Reissued Patent
Peterson

(10) Patent Number: US RE38,724 E
(45) **Date of Reissued Patent: *Apr. 12, 2005**

(54) METHOD AND APPARATUS FOR PROVIDING SHORTEST ELAPSED TIME ROUTE AND TRACKING INFORMATION TO USERS

(76) Inventor: Thomas D. Peterson, 1435 E. Napa St., Sonoma, CA (US) 95476

( * ) Notice: This patent issued on a continued prosecution application filed under 37 CFR 1.53(d), and is subject to the twenty year patent term provisions of 35 U.S.C. 154(a)(2).

This patent is subject to a terminal disclaimer.

(21) Appl. No.: 09/721,608

(22) Filed: Nov. 21, 2000

Related U.S. Patent Documents

Reissue of:
(64) Patent No.: 5,845,227
Issued: Dec. 1, 1998
Appl. No.: 08/599,309
Filed: Feb. 9, 1996

U.S. Applications:

(63) Continuation-in-part of application No. 08/436,892, filed on May 8, 1995, now Pat. No. 5,523,950, which is a continuation of application No. 08/032,830, filed on Mar. 10, 1993, now abandoned, which is a continuation of application No. 07/649,599, filed on Feb. 1, 1991, now abandoned.

(51) Int. Cl.[7] ..... G01C 21/34
(52) U.S. Cl. ..... 701/209; 701/117; 701/213; 340/905; 340/989

(58) Field of Search ..... 701/117, 119, 701/200, 202, 208, 209, 210, 213; 340/905, 988, 989, 990, 993, 995

(56) References Cited

U.S. PATENT DOCUMENTS 4,812,843 A * 3/1989 Champion, III et al. .... 701/117
4,954,958 A * 9/1990 Savage et al. ..... 701/202
5,172,321 A * 12/1992 Ghaem et al. ..... 701/202

(Continued)

OTHER PUBLICATIONS

Boyce, David E., "Route Guidance System for Improving Urban Travel and Location Choices", Journal of Transportation Research, 1998, pp. 277–281.

*Primary Examiner*—Gary Chin
(74) *Attorney, Agent, or Firm*—Don E Erickson

(57) ABSTRACT

A method and apparatus for determining and communicating shortest elapsed time route information to users wherein information of desired origin and destination combinations is received from the users in a central processor or computer, instant rates of travel on multiple route segments interconnecting various possible origins and destinations being monitored and transferred to the central processor which then calculates the route segment or segment combination providing shortest elapsed time routes for each origin-destination combination and transmitting that information to the respective user. Communication between the central processor and the users is preferably by telephone and more preferably by cellular telephone.

32 Claims, 9 Drawing Sheets

U.S. PATENT DOCUMENTS 5,272,638 A * 12/1993 Martin et al. ..... 701/202
5,297,049 A * 3/1994 Gurmu et al. ..... 701/117
5,369,588 A * 11/1994 Hayami et al. ..... 701/209
5,428,544 A * 6/1995 Shyu ..... 701/117
5,428,545 A * 6/1995 Maegawa et al. ..... 701/210
5,515,042 A * 5/1996 Nelson ..... 701/119
5,523,950 A * 6/1996 Peterson ..... 701/117
5,539,398 A * 7/1996 Hall et al. ..... 701/213
5,559,707 A * 9/1996 DeLorme et al. ..... 701/200
5,610,821 A * 3/1997 Gazis et al. ..... 701/202
5,646,853 A * 7/1997 Takahashi et al. ..... 701/117
5,654,891 A * 8/1997 Naccache et al. ..... 701/119
5,734,337 A * 3/1998 Kupersmit ..... 701/119
5,742,699 A * 4/1998 Adkins et al. ..... 701/119
5,774,827 A * 6/1998 Smith, Jr. et al. ..... 701/202
5,875,412 A * 2/1999 Sulich et al. ..... 701/210
5,933,100 A * 8/1999 Golding ..... 701/213
6,006,159 A * 12/1999 Schmier et al. ..... 701/200

* cited by examiner

| Phone key, City, Node | Phone key, City, Node | Introduction Scripts |
|---|---|---|
| 2#13, Berkeley, H | #101 #101, 101/280 Inter, M | Dial Code "902" |
| 2#24, Berkeley, H | #101 #101, East Palo Alto, Q | You have reached the Traveler Information Services for the Bay Area. This service provides route recommendations to minimize time spent in route. Please key in the first letter of your city of origin, followed by a |
| 2#280, Belmont, P | #101 #101, San Francisco, L | |
| 2#680, Benioia, C | #101 #101, San Jose, BB | |
| 2#780, Benioia, C | #101 #101, San Mateo, O | |
| 2#92, Belmont, P | #101 #101, Santa Clara, AA | |
| 2#238, Castro Valley, T | #101 #237, Santa Clara, AA | |
| 2#280, Cupertino, CC | #101 #280, 101/280 Inter, M | |
| 2#4, Concord, D | #101 #280, San Jose, BB | |
| 2#580, Castro Valley, T | #101 #580, San Rafael, K | |
| 2#680, Concord, D | #101 #80, San Francisco, L | |
| 2#680, Cordelia, A | #101 #84, East Palo Alto, Q | Dial Code "903" |
| 2#80, Cordelia, A | #101 #85, Santa Clara, AA | You have reached the Traveler Information Services for the Bay Area Commuter Version. Please key in the first letter of your city of origin, followed by a a pound sign, and the highway number without a prefix ending with the star or the |
| 2#85, Cupertino, CC | #101 #880, San Jose, BB | |
| 2#880, Castro Valley, T | #101 #92, San Mateo, O | |
| 2#92, Castro Valley, T | #13 #24, Berkeley, H | |
| 3#580, Dublin, W | #13 #580, Oakland, R | |
| 3#680, Dublin, W | #237 #101, Mountain View, Z | |
| 3#580, Emeryville, J | #237 #680, Mountain View, Z | |
| 3#80, Emeryville, J | #237 #85, Santa Clara, AA | |
| 3#84, Fremont, V | #237 #880, Milpitas, Z | Dial Code "904" |
| 3#880, Fremont, V | #238 #238, Castro Valley, T | You have reached the Traveler Information Services for the Bay Area Trucker Version. Please key in the first letter of your city of origin, followed by a a pound sign, and the highway without a prefix, ending with the star or the |
| 4#238, Hayward, U | #238 #580, Castro Valley, T | |
| 4#880, Hayward, U | #238 #580, Castro Valley, T | |
| 4#92, Hayward, U | #238 #680, 238/680 Inter, X | |
| 6#101, Milpitas, Z | #238 #880, 238/880 Inter, Y | |

Fig. 6

SENSOR TABLE

| Route | | | ET (in Minutes) | | Sensor Data | | | | | | |
|---|---|---|---|---|---|---|---|---|---|---|---|
| Highway Number | X, Y | Dist | X to Y | Y to X | $S_1$ | $S_2$ | $R_1$ | $R_2$ | $Z_S$ | $Z_R$ | |
| 80 | A, B | 13 | 15.6 | 19.5 | 50 | 50 | 40 | 40 | 1 | 1 | 60 |
| 680 | A, C | 14 | 28 | 24 | 30 | 30 | 35 | 35 | 1 | 1 | 60 |
| 101 | AA, BB | 11 | 16.5 | 44 | 40 | 40 | 15 | 15 | 1 | 1 | 60 |
| 85 | AA, CC | 5 | 20 | 15 | 15 | 15 | 20 | 20 | 1 | 1 | 60 |
| 101 | AA, Q | 8 | 13.7 | 10.7 | 35 | 35 | 45 | 45 | 1 | 1 | 60 |
| 237 | AA, Z | 8 | 12 | 10.7 | 40 | 40 | 45 | 45 | 1 | 1 | 60 |
| 780 | B, C | 6 | 9 | 24 | 40 | 40 | 15 | 15 | 1 | 1 | 60 |
| 80 | B, E | 6 | 9 | 8 | 40 | 40 | 45 | 45 | 1 | 1 | 60 |
| 280 | BB, DD | 5 | 8.6 | 10 | 35 | 35 | 30 | 30 | 1 | 1 | 60 |
| 880/101 | BB, Z | 8 | 13.7 | 12 | 35 | 35 | 40 | 40 | 1 | 1 | 60 |
| 680 | C, D | 6 | 10.3 | 12 | 35 | 35 | 30 | 30 | 1 | 1 | 60 |
| 280 | CC, DD | 5 | 6 | 7.5 | 50 | 50 | 40 | 40 | 1 | 1 | 60 |
| 280 | CC, P | 20 | 48 | 60 | 25 | 25 | 20 | 20 | 1 | 1 | Switch |
| 4 | D, E | 11 | 18.9 | 16.5 | 35 | 35 | 40 | 40 | 1 | 1 | |
| 680 | D, G | 6 | 12 | 7.2 | 30 | 30 | 50 | 50 | 1 | 1 | |
| 80 | E, F | 8 | 12 | 13.7 | 40 | 40 | 35 | 35 | 1 | 1 | |
| 80 | F, J | 6 | 14.4 | 12 | 25 | 25 | 30 | 30 | 1 | 1 | |
| 580 | F, K | 12 | 24 | 20.6 | 30 | 30 | 35 | 35 | 1 | 1 | |
| 24 | G, H | 10 | 13.3 | 17.1 | 45 | 45 | 35 | 35 | 1 | 1 | |
| 680 | G, W | 16 | 24 | 64 | 40 | 40 | 15 | 15 | 1 | 1 | |
| 24 | H, I | 2 | 6 | 4.8 | 20 | 20 | 25 | 25 | 1 | 1 | |
| 13 | H, R | 6 | 8 | 10.3 | 45 | 45 | 35 | 35 | 1 | 1 | |
| 580 | I, J | 1 | 3 | 4 | 20 | 20 | 15 | 15 | 1 | 1 | |
| 580 | I, R | 6 | 9 | 10.3 | 40 | 40 | 35 | 35 | 1 | 1 | |
| 880 | I, S | 14 | 42 | 56 | 20 | 20 | 15 | 15 | 1 | 1 | |
| 80 | J, L | 9 | 10.8 | 13.5 | 50 | 50 | 40 | 40 | 1 | 1 | |
| 101 | K, L | 14 | 21 | 56 | 40 | 40 | 15 | 15 | 1 | 1 | |
| 101 | L, M | 3 | 4.5 | 4 | 40 | 40 | 45 | 45 | 1 | 1 | |

Calculate Estimated Time of Arrival

*Fig. 8*

METHOD AND APPARATUS FOR PROVIDING SHORTEST ELAPSED TIME ROUTE AND TRACKING INFORMATION TO USERS

Matter enclosed in heavy brackets [ ] appears in the original patent but forms no part of this reissue specification; matter printed in italics indicates the additions made by reissue.

This reissued patent is based on U.S. Pat. No. 5,845,227, which is a continuation-in-part of allowed U.S. patent application Ser. No. 08/436,892, filed May 8, 1995, now U.S. Pat. No. 5,523,950 which is a continuation of Ser. No. 08/032,830, filed Mar. 10, 1993, abandoned, which is a continuation of Ser. No. 07/649,599, filed Feb. 1, 1991, abandoned.

FIELD OF THE INVENTION

The present invention provides a method and apparatus for supplying traffic information to users and more particularly to such a method and apparatus for assisting the users in selecting shortest elapsed time routes between various origin and destination combinations. In addition, the invention proves useful for vehicle tracking and management. The routing is up to the minute, dynamic, constantly keeping track of the current traffic and recalculating the user's route considering all changes and calls him back if the route can be improved.

BACKGROUND OF THE INVENTION

Substantial effort has been exerted in the past and is continuing to be directed toward solution of the problem directing traffic in a manner to facilitate travel by individual vehicles between a wide variety of origin and destination combinations in a minimum amount of time. This problem is particularly severe in extended urban areas where individual vehicles commonly travel long distances from various points of origin to various destinations. Fleet operators in these environments suffer from not having effective utilization of their drivers and vehicles.

In most such extended urban areas, there is a wide variety of routes available to each vehicle. Accordingly, the travel time for each vehicle could be shortened and traffic control efforts could generally be much more efficient if individual vehicles could be supplied with the shortest elapsed time route information for their respective origins and destinations at the particular travel time for each vehicle.

Obviously, such information pertains not only to commuters but to business and recreational travelers at any time as well as service vehicles such as delivery trucks and the like.

At the same time, such information is particularly desirable in extended urban areas as noted above. However, it is more broadly contemplated that such information may be of value in any selected region, from small to large scale, where there are a variety of route segments available for traveling between different origin and destination combinations.

For purposes of the present invention, the San Francisco Bay Area has been selected as one typical extended urban region wherein such information and traffic control would be particularly desirable. However, it is to be noted that the selection of this region is merely for purposes of example. More broadly, as noted above, the invention is applicable to any region where there are various route combinations possible between each origin and destination combination.

Both commercial and government concerns have been attempting to develop traffic control systems for alleviating these problems. However, even where mass transit systems have been effective for transporting substantial numbers of people, there still remain large numbers of individual vehicles traveling throughout such extended areas, both during peak hours and throughout the entire day.

As noted above, many solutions have been explored or proposed for providing necessary traffic control in such situations. Possibly one of the most basic efforts was the supplying of maps, by Rand McNally Company and others, the maps presenting both distances in terms of statutory miles and normal travel times in hours and minutes along large numbers of interconnected route segments. Such maps were helpful to travelers in selecting a most efficient travel route. However, that information was generally accurate under optimum or standard conditions and did not provide any information to the user concerning instantaneous conditions along different route segments. U.S. Pat. No. 4,301,506 issued to Turco provided a computerized system for use in such situations. However, that patent contemplated an on-board computer or processor for each individual vehicle for providing alternative route information in the event of traffic stoppage along any particular route segment. This solution was relatively complex and expensive and in addition, generally did not provide assistance until the individual vehicle encountered an actual condition of traffic stoppage or back-up.

U.S. Pat. No. 4,350,970 issued Sep. 21, 1982 to von Tomkewitsch provided yet another traffic routing and information system in which stationary routing status transmission poles were used to monitor traffic flow and to transmit information concerning traffic conditions to passing vehicles. However, within this system, it was necessary for each individual vehicle to have the capability for transmitting travel time information between the fixed pole locations along a given route. A central computer or processor was coupled with the fixed poles to assemble information from the vehicles and, in turn, to provide information to the vehicles through the fixed transmission poles regarding conditions to be encountered by the vehicles.

Here again, however the system was relatively expensive and complex in terms of the equipment required for the individual vehicles.

More recently, U.S. Pat. No. 4,812,843 issued Mar. 14, 1989 to Champion, III, et al. provided yet another traffic information system directly accessible by individual users by means of telephone, mobile telephone or computer. In this system, a central computer or processor provided a sorting function of selecting traffic information specific to a contemplated route for each individual vehicle and transmitting only the appropriate information to the respective vehicles.

Here again, although relatively efficient, this system was capable only of providing information to individual vehicles for predetermined routes of travel.

The above are only representative of a very wide variety of traffic control systems adapted for resolving such problems. It is particularly important to note that, while advancing technology, a wide variety of means are available both for transmitting necessary information and for accomplishing necessary monitoring in such systems. It is particularly to be noted that conventional or wire-tied telephones have long been available for such purposes. More recently, mobile or cellular telephones have become increasingly popular and provide one particular means for supplying information to individual vehicles. It is also to be noted that mobile or cellular telephones are merely one form of a wireless communication link between a central processor or the like and individual vehicles. Other forms which would perform the function are two-way radio, paging, text messaging systems, personal communication services (PCS), fax, satellite link and the like at any frequency by any means.

In any event, there has been found to remain a need for a more effective traffic control system for supplying instantaneous route information to individual vehicles, particularly vehicles faced with a variety of routes between a given origin and destination combination. The fleet owner has the same problem in deriving the benefits of efficient and profitable operation of his fleet.

SUMMARY OF THE INVENTION

It is initially noted that the present invention is concerned with providing assistance to individual vehicles according to their unique and instantaneous requirements. Accordingly, traffic control systems adapted for simultaneously regulating route information for large numbers of vehicles are outside the scope of the present invention except as it applies to fleets of vehicles. Fleets are simply managing many individual vehicles each with its unique origin, destination, and time of departure.

Rather, it is an object of the present invention to provide individual vehicles or drivers with desired information in terms of the shortest elapsed time route between a particular origin and destination or multiple destinations for a given trip combination.

More particularly, the invention contemplates a method and apparatus for simultaneously supplying such information to large numbers of users having different origin and destination combinations. Still further, the method and apparatus may be applied to a specific user area or even to a number of interconnected or overlapping user areas. In any event, the method and apparatus of the invention are specific to a given region including a wide variety of route segments providing different travel combinations between selected origin and destination combinations.

Broadly, it is an object of the invention to provide a method and apparatus wherein instantaneous rates of travel are mounted along each of the possible route segments in a given region, with that instantaneous rate information being transferred to a central processor or computer which is also equipped to receive information regarding caller's identity (ID), and desired origin-destination combinations from different users. The central processor then calculates the route segment or combination of route segments providing a shortest elapsed time route between each origin-destination combination and transmits that information to the respective users. If the user registers his identity in any other way, for example, phone number, caller ID, (caller ID is now automatic in some areas) or by internet connection, which transmits the user's web address (identity), the invention will perform a number of functions to help them.

The computer will automatically keep track of the user's most frequently requested trips and present them as choice, i.e., home to work, work to home.

The computer will keep track of the type of vehicle the user is driving. If the vehicle is a truck, it will indicate what size truck. If it is an automobile, the computer will determine if there are sufficient passengers to qualify to use the high occupancy vehicle (HOV), lanes. Once the vehicle type is determined, the computer determines which subset of all interconnect arc segments (the grid) the vehicle has permission to run on, and then calculates the shortest time route considering only those route segments the user has permission to use. Permission is generally set by government authorities and often varies by time of day and day of week.

The computer will automatically keep track of the user's current location by assuming that the user is on the shortest time route and that he is travelling at the speed of traffic predicted for him based on his own individual driving profile. While the user calls in and enters his caller ID, the computer will say "Traffic Assist calculates your current position as . . . " The computer then prompts the user to identify his actual location in relation to the computer calculated vehicle position until the computer identifies the user's exact location. For users equipped with Global Positioning Systems (GPS), the location of the vehicle will be determined by the computer through communication with the GPS device in the vehicle.

The computer will monitor the user's progress and upon request will be available to identify the user's current location and to provide further directions and the arrival time. It is further the objective to constantly recalculate the user's route and to call the user back if conditions change and additional time can be saved. If a change in route is necessary, the computer will ask the user if he has passed a particular junction which is the beginning of the new route. If the user's answer is no, the computer will give the user his new route to begin at the particular junction.

Preferably, the central processor or computer is also capable of applying historical data for predicting rates of variation at any given time and date for each route segment. Accordingly, the method and apparatus of the invention preferably calculate and transmit to the users the shortest elapsed time route information for the actual time when the individual vehicle will be traveling between its origin-destination combination.

Thus, the present invention provides a method and apparatus for providing individual vehicles or drivers which necessary information for determining the most rapid route between a selected origin-destination combination. The invention relies upon sensors (sensors would include tag readers and differential video imagery) or probes (which would include velocities, or changing position data feed back from vehicles from which elapsed times can be calculated. Further example is the hand off from cell to cell in a cellular phone system) along the various route segments in order to transmit instantaneous rate information for those segments to a central computer. The central computer receives the information from all of the sensors and probes along the various route segments and applies that information to input equations or algorithms for determining the actual elapsed time, under present conditions, between points defining each route segment. Typically, those points are selected as principal arterial highway intersections, nodes and the like. Algorithms are then applied within the central computer for comparing actual elapsed times for the various route segments and aggregating that information in order to determine the shortest elapsed time route between any point of origin and destination.

As noted above, the central computer is also equipped to continuously recognize historical rates of change for travel updated from public and private agencies as well as ongoing rates from sensors and probes along the various route segments so that the shortest elapsed time route information can be selected for the actual times contemplated for travel by the individual vehicle.

Furthermore, the central computer preferably includes means for storing travel data for each user for a predetermined amount of time. If communication means is available to the vehicle, for example by mobile or cellular telephone, updated information can then be transmitted to the individual vehicle if necessary or desirable. The route in progress feature allows the driver to contact by available means, for example, to call to verify his location and receive directions for the remaining portion of the trip. Additionally, the computer constantly monitors the route the driver has been given and recalculates the shortest time route from his updated origin to determine if his route can be improved. If conditions change and additional time can be saved, the computer will make contact, for example, call the driver back and advise the driver of the new route.

Tracking is an additional feature of the invented system. The system is predictive as opposed to the other systems which are reactive. Other tracking systems require the system to be notified that the vehicle is missing, at which time the system will start to track the vehicle. In the invented system, when the vehicle starts to move, the driver is asked to give his destination. The computer knows his origin because the vehicle has the GPS signal, the means to determine the GPS change, and communication means. When the destination is input, the computer calculates the fastest route and relays it to the driver. Optionally, this trip can be dispatched on the dispatcher's screen. Simultaneously with giving the driver the best route, the computer down loads this route, its list of waypoints and expected time of arrival, based on individual driver patterns, and the driver's time tolerances. If the vehicle does not stay on course or on schedule the vehicle and/or the dispatcher can be called.

Additionally, the logic device associated with the GPS unit which comprises current vehicle location against waypoints can be set to act as a precursor to approaching changes in route, or hazards such as at grade railroad crossings. The driver going west on 80 would hear a bell or a recording advising of his upcoming turn to 101 South.

This tracking system allows a dispatcher to have complete and accurate status for each vehicle, so that the dispatcher can manage by exception with a minimum of information transmission. Management can focus on whichever vehicles they choose, including those that are not where they should be, making them much more effective.

The invention stresses efficiency while giving management unparalleled control. When any of the fleet vehicles move off its predetermined course based on predetermined rules, the dispatcher can know it. The vehicle is immediately called and asked its destination. A dispatched vehicle knows its destination. Communication is minimized by down loading the waypoints and having useful intelligence on both ends of the communication. The logic device in the vehicle only calls if the vehicle is not on route or on schedule.

The invention can give the fleet dispatcher a graphical and audio picture of any equipment. It gives the dispatcher the information as to where the transportation resources are and whether they are loaded or empty, ambulances or fire trucks, etc.

More particularly, it is the object of the present invention to include delivery locations as destinations. Such delivery locations allow the user to request the nearest Radio Schack®, Nordstrom®, M.G. dealer as a destination. This allows the user the efficiency of expending the shortest time to accomplish the desired task.

Bookmarks stored in the central computer, at the request of the user, allow the recording of origin destination pairs for future fast access. For example, the user saves his home, origin, work, and destination for future speed dial access.

The system further allows the users to determine whether mass transit might improve their trip. The user inputs his origin and destination. The computer calculates the shortest time route for the user's vehicle. The computer determines if the user's origin and destination are both conveniently served by mass transit. The user can then be provided with the comparative shortest time mass transit time and routing instructions.

Additional objects and advantages of the present invention are made apparent in the following description having reference to drawings summarized immediately hereinafter.

BRIEF DESCRIPTION OF THE DRAWINGS

FIG. 6 is a further representation of the selected region of FIG. 1 together with symbols indicating origin and destinations (also termed "nodes") and corresponding names of cities, towns, for example.

FIG. 8 is a partially graphic and partially pictorial representation of data illustrating the relationship between sensed traffic velocities from sensors S1, S2, R1 and R2, etc. and the estimated elapsed time for each of the highway segments, A, R, etc.; a small table in the upper right corner of FIG. 8 providing a switch of data depending upon different speed limits, for example 60 miles per hour, the switch making the minimum travel time and distance the same in order to verify the model employed in the central computer.

DESCRIPTION OF THE PREFERRED EMBODIMENT

Figure 1:
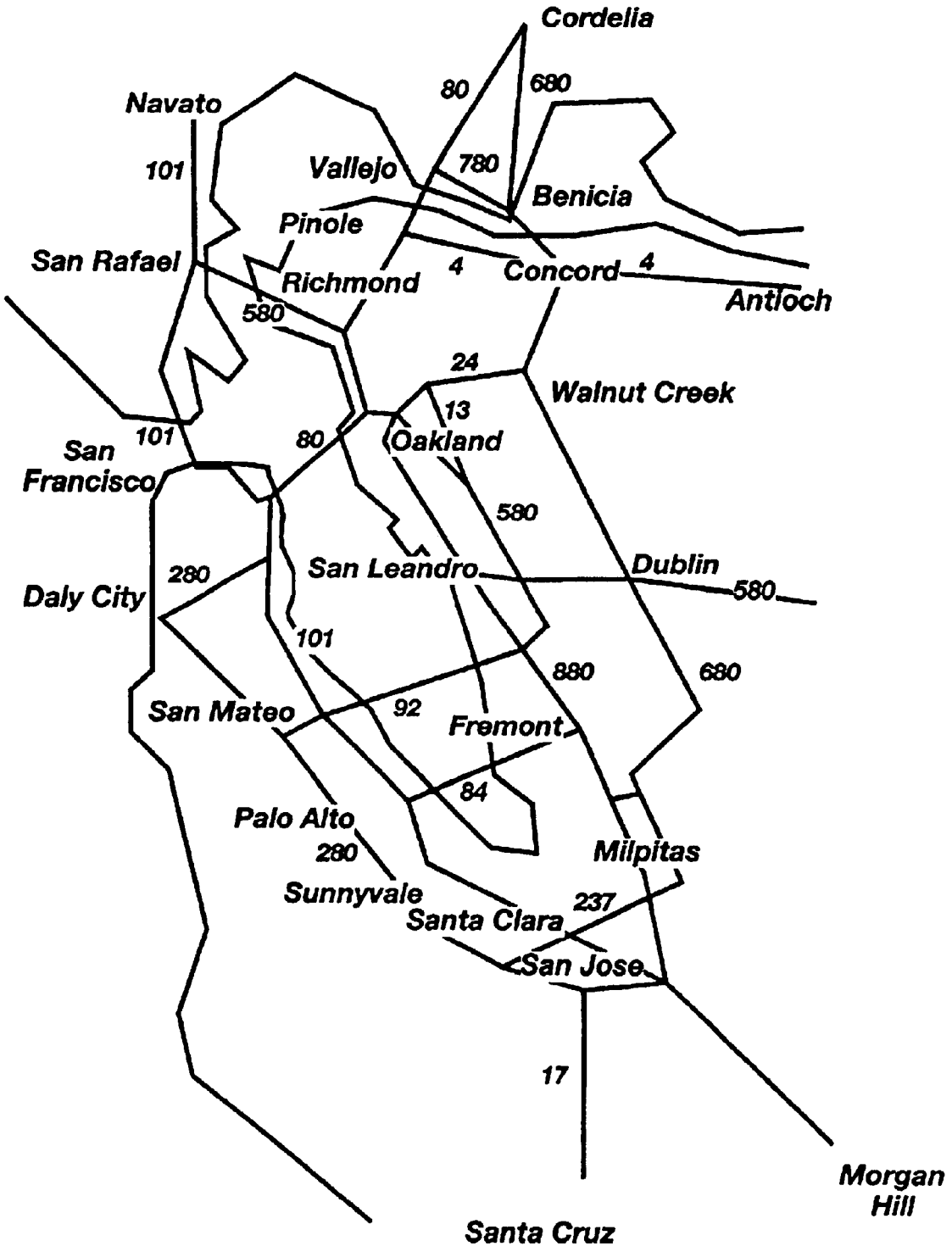
FIG. 1 is a graphical representation, generally in the form of a map of a selected region, typically the San Francisco, Calif. Bay Area, having a large number of interconnecting route segments providing alternate travel paths between a variety of selected origins and destinations.

As noted above, the present invention provides a method and apparatus for determining and communicating shortest elapsed time route information to users. The users are contemplated as traveling between various combinations of origin and destination in a region of the type represented by the San Francisco, Calif. Bay Area in FIG. 1. Referring to FIG. 1, various route segments are illustrated between interconnecting points or nodes represented by one or more letters. FIG. 1 has been simplified in that the interconnections or nodes are taken as various cities throughout the region in order to simplify identification of the various route segments. For example, A indicates Cordelia, Calif.; Z represents Milpitas, Calif.; AA represents Santa Clara, Calif.; while DD represents San Jose, Calif. Thus, each interconnecting route segment may be identified by a combination of letters. For example, A-B between Cordelia and Vallejo, Calif.; A-C between Cordelia and Benicia, Calif.; etc. Other symbols for specific locations in the selected region of FIG. 1 are indicated for example in FIG. 6.

Numerical routes designations are also indicated for different highway segments in FIG. 1.

Figure 2:
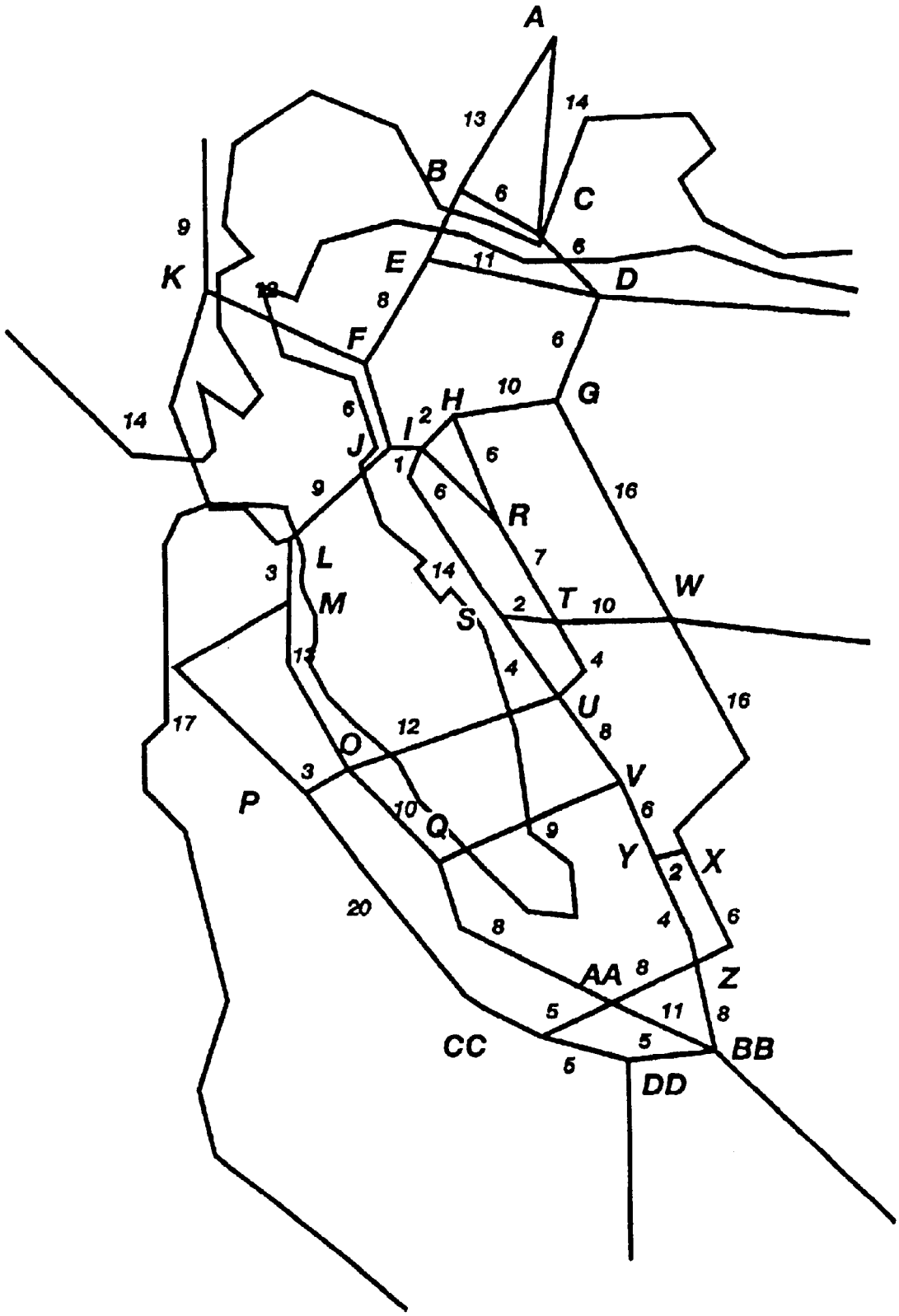
FIG. 2 is a graphical representation generally similar to FIG. 1 but including only the interconnected route segments with the interconnections or nodes between adjacent route segments being indicated by corresponding letters, the length of each route segment being indicated numerically.

FIG. 2 illustrates the same interconnecting nodes or cities with the same route segments represented in the same manner described above with reference to FIG. 1.

Figure 3:
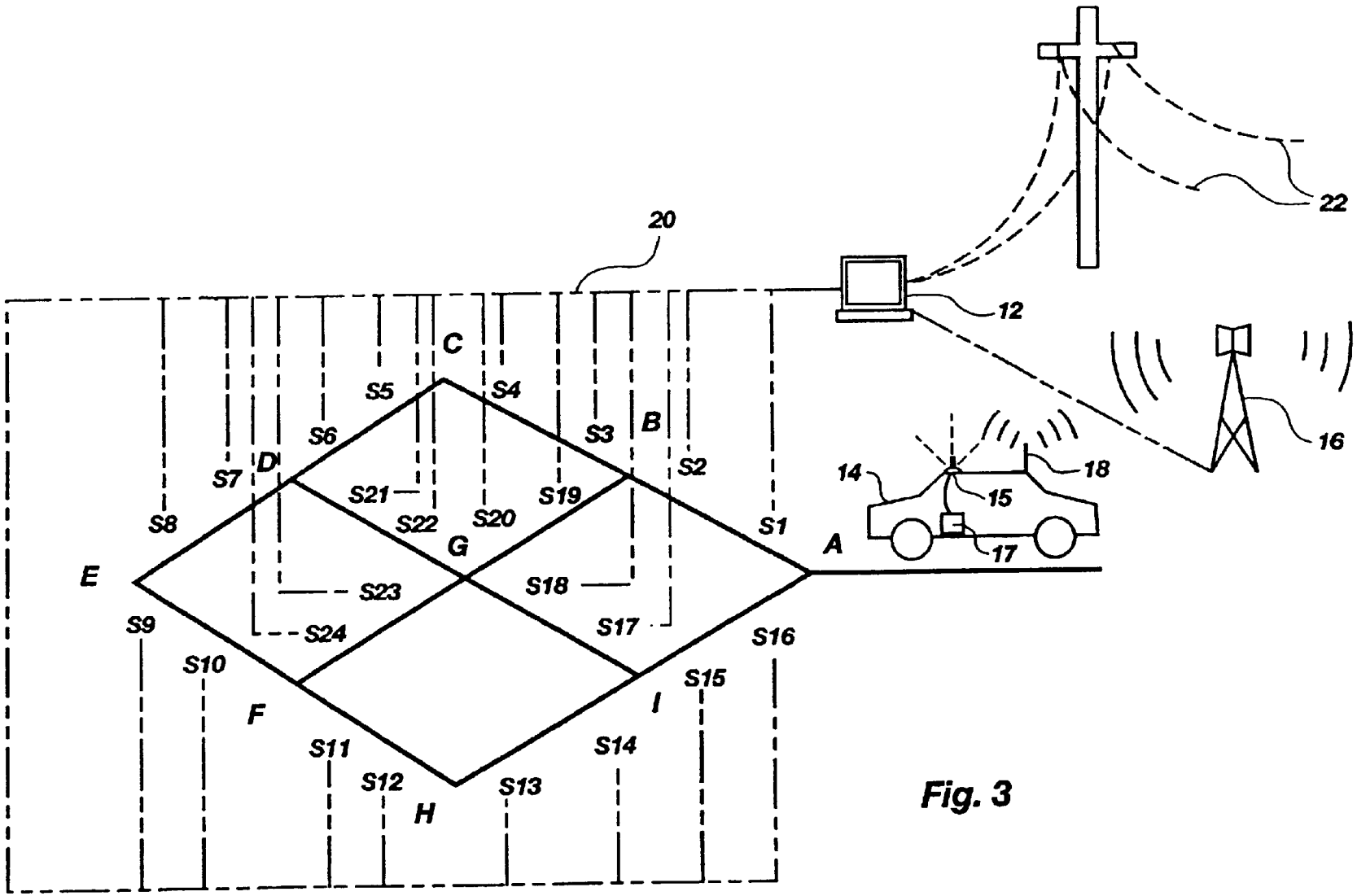
FIG. 3 is a graphical representation of an idealized region illustrating alternate route segments interconnecting a single origin and a single destination as a simplified means for illustrating the method and apparatus of the invention, the apparatus including the central computer, means for communication with the user and the sensors providing instantly updated information to the central computer.

The method and apparatus of the invention can probably best be described by reference to the simplified or stylized grid for a region represented in FIG. 3. In FIG. 3, the interconnecting points or nodes for a variety of route segments are represented by similar letters A, B, C, etc., Accordingly, the various route segments in FIG. 3 may similarly be represented as A -B, B -C, C- D, D -E, etc. Similarly, with A and E respectively representing point of origin and destination (at least for westbound traffic as illustrated), then alternate paths of travel could be represented as A -B -C -D -E and A -I -H -F -E. Other combinations are also available including the central node G.

Continuing with reference to FIG. 3, rate of travel sensors are positioned along each of the route segments A -B, B -C, etc. throughout the entire grid being controlled by a central computer indicated at 12. The individual rate sensors in one direction are represented as S1, S2, S3, S4, etc. while sensors in the other direction are represented as $R_1$, $R_2$, etc. Preferably, a plurality of rate sensors are arranged along each of the route segments in order to provide a more accurate reflection of rate of travel along the respective route segments. As illustrated in FIG. 3, two such rate sensors are positioned along each route segment. However, different numbers of sensors could be employed on different segments, for example if the different route segments are of different length of if they include different numbers of locations representing possible points of conflict for traffic.

In any event, the individual rate sensors S1, S2, etc. are all interconnected with the central computer 12 so that the central computer 12 has continuing access to instant rates of travel for all of the route segments in the grid being controlled by the central computer 12.

The individual rate sensors S1, S2, etc. may take a variety of forms. For example, the sensors could be radar or infrared based detectors of a type commonly employed for monitoring vehicular rates of travel. Probes could be sending back changes in position or velocity or elapsed time between points. Proper interconnections between the sensors and the central component 12 provide the computer not only with the rate of travel at each point but also, if desired, the number of vehicles traveling past that point at any given time interval. Additional useful route information will be provided to the user.

Preferably, the rate sensors S1, S2, etc. comprise electronic loop detectors by a type embedded in the roadway for all lanes of travel at each detection point, the computer can analyze each lane separately to provide for high occupancy vehicle (HOV), truck lanes etc. Detectors of this type are described in greater detail, for example, in U.S. Pat. No. 4,680,717 issued Jul. 14, 1987 to Martin. The detectors of that patent may be employed for monitoring traffic volume, for example, and multiply or in pairs for monitoring traffic velocity. The actual construction and operation of the rate detectors are not an element of the present invention except for performing their conventional function of monitoring rates of travel for traffic at each of the sensor points S1, S2, etc. Accordingly, the construction and method of operation for the sensors are not described in greater detail. However, the above noted patent describing such sensors in greater detail is incorporated herein by reference as though set forth in its entirety to provide greater information if desired.

The central computer 12 is adapted for simultaneously receiving large amounts of information and calculating and transmitting shortest elapsed time route information for large numbers of origin-destination combinations to a corresponding number of users. Here again, the specific selection and method of operation for the central computer 12 is not a specific feature of the present invention. However, it is generally noted that computers of the type described in the patent references above would also be generally satisfactory for purposes of the present invention. In that regard, characteristics of the central computer such as operating speed, data storage capacity, etc. are in large part a function of the complexity of the region to be regulated by the computer.

Finally, means are also contemplated for providing communication between the central computer 12 and large numbers of users, one such user being represented by a vehicle indicated generally at 14.

As noted above, wire-tied telephones 22 could be employed for this purpose. However, in that event, it would be necessary for each user to contact the central computer 12, probably prior to commencing travel between a selected origin-destination combination.

For that reason, the invention preferably contemplates means such as mobile devices, i.e., radio, fax, pager, data terminal, satellite connection or cellular telephone for providing communication between the central computer 12 and each user vehicle such as that indicated at 14. Accordingly, the central computer 12 is preferably coupled with a mobile telephone broadcasting station 16 while each vehicle user 14 is provided with a cellular telephone, represented by the antenna 18, for maintaining communication with the central computer 12 by means of the mobile telephone station 16. In addition, it is contemplated that the vehicle 14 may be equipped with a GPS unit which continuously looks to satellites and its own algorithms to determine the latitude and longitude of the vehicle 14.

Here again, the construction and mode of operation for the mobile or cellular telephone is not a feature of the invention as such, only the function of the cellular telephone system in maintaining communication between the central computer 12 and each vehicular user 14. However, a cellular radio telephone system of the type contemplated by the present invention is disclosed for example in U.S. Pat. No. 4,144,411, issued Mar. 13, 1979, that reference being incorporated herein as though set forth in its entirety to provide additional information as necessary or desired for a more complete understanding of the invention.

Additionally, the construction and mode of operation for the GPS unit 15, is not a feature of the invention as such, only the function of the GPS unit maintaining its current coordinates and communicating them to a logic device, 17 and hence to the central computer 12.

It is noted that the individual sensors S1, S2 may also be placed in communication with the central computer 12 by telephone or other means. Since the sensors are immobile, it is contemplated that they are preferably interconnected with the central computer 12 by the most cost-efficient method available generally represented by broken lines at 20. Probes would communication by mobile devices similar to the system users and in fact may be system users.

Thus, the central computer 12 is in continuing communication with all of the sensors (tag readers) S1, S2, etc. as well as any number of users such as the user/probe vehicle represented at 14. With such a combination of apparatus, the invention is contemplated for operation in a method described immediately below.

Very generally, it is contemplated that the central computer 12 receive continuing instant rate of travel information from all of the rate sensors (tag readers) S1, S2, etc. and probes 14 so that the central computer 12 has immediate access to rates of travel along all of the route segments A -B, B -C, etc.

With that rate information available, the individual users such as the vehicle user 14 then contact the central computer 12 and request the shortest elapsed time route for any given origin-destination combination, for example A -E in FIG. 3. The central computer 12 is immediately capable of calculating all possible combinations and immediately communicating to the individual user the preferred or shortest elapsed time route for the requested origin-destination combination.

It is further contemplated that the central computer 12 is capable of storing information regarding each user, preferably for a predetermined period of time corresponding to the contemplated travel time for the user. With the user being in continuing communication with the central computer 12, for example by means of mobile radio telephone as described above, the central computer 12 is then capable of providing updates as necessary to the individual user if necessary for adjusting or altering the shortest elapsed time route for that user. The user's current change in position, latitude and longitude, can be used as a probe. In addition, the current position in conjunction with the route can be used by the dispatcher.

It is the current practice to label all the intersections in an area as nodes, and attach to them their geographical location (their latitude and longitude). The current practice further describes the highway between the nodes and calls them arcs. When the computer 12 calculates the shortest time route, the nodes along that route are called waypoints.

At the same time, the central computer 12 is also contemplated as including historical data illustrating normal rates of increase or decrease in travel time along each route segment depending upon the time of day, day of the week and month or year, etc. With such historical information the central computer 12 is then capable of making adjustments in the shortest elapsed time route for each user. For example, the central computer could use such historical data either for varying the shortest elapsed time route if necessary or for providing the user with a minimum travel time and route between the respective origin and destination. In other words, the invention provides the user with information statistically comprising the best or minimum elapsed time and route between any combination of origin and destination. Since the computer provides that information before the user actually travels along the recommended route, the recommended route is, in effect, based on probability. The probability of the recommended route providing the shortest elapsed travel time is enhanced when the instantly monitored rates of travel on the different route segments are adjusted by historical data, censored and probe data referred to above and described in greater detail below. Generally, the most accurate predictor of elapsed time now is the sensed velocities; two hours from now the probability based most accurate velocity is one hundred percent historical patterns. The central computer calculates the least time route based on giving weight to sensor data in the near horizon and historical in the far horizon. This feature is part of the refinement that allows the computer to suggest a time of departure based on a required time of arrival.

It will be obvious that the central computer 12 may also have additional capabilities. For example, for users such as delivery services and the like, data may be supplied for multiple or even large numbers of user vehicles, possibly with different origin-destination combinations, etc. Furthermore, the central computer 12 could also be adapted to provide shortest elapsed time routes for multiple destinations, for example, if an individual user wishes information as to the shortest time for traveling to multiple addresses, either in a particular order or in an order determined by the central computer.

Figure 4:
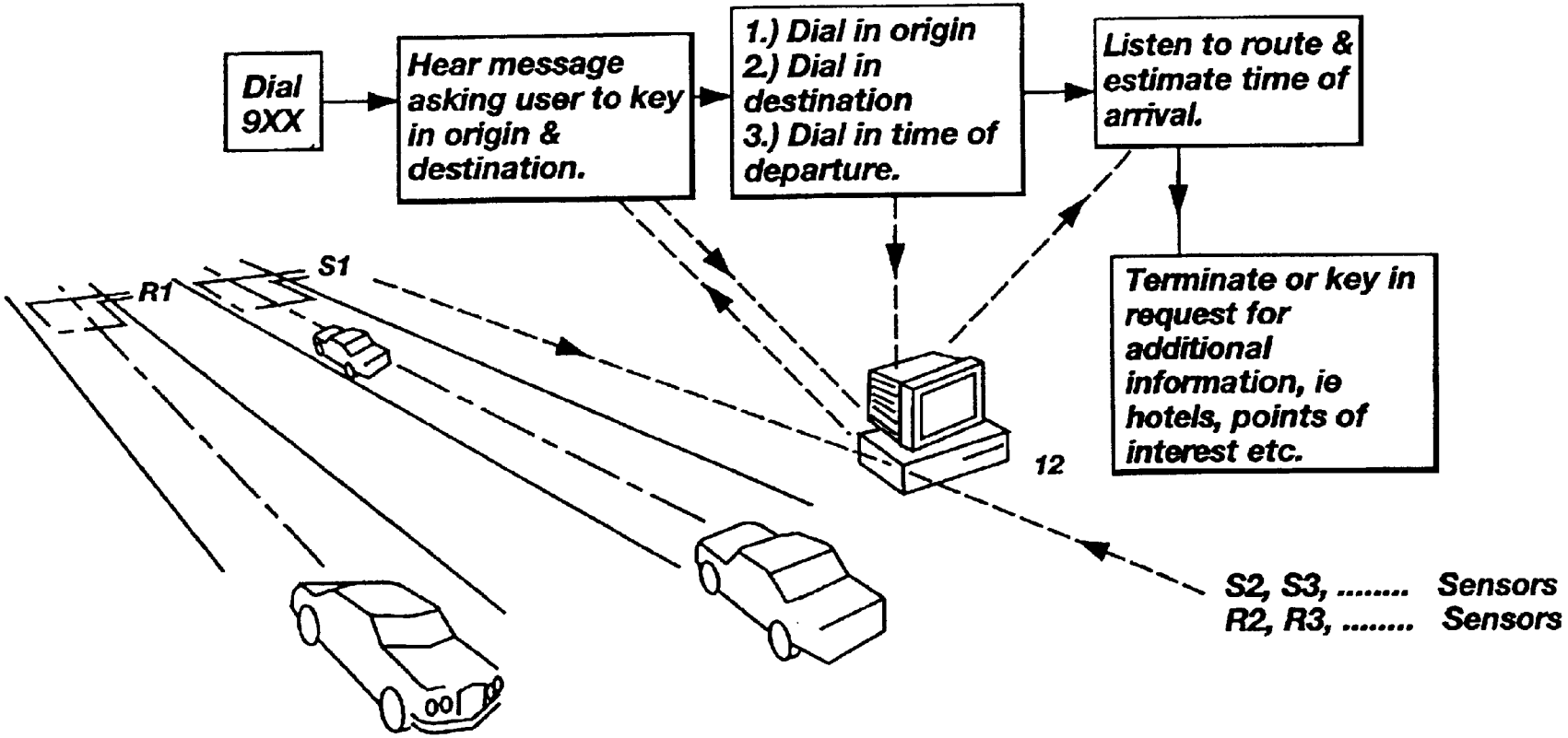
FIG. 4 is a representation generally in the form of a flow chart illustrating steps employed by a user and information flow to and from the central computer.
Figure 5:
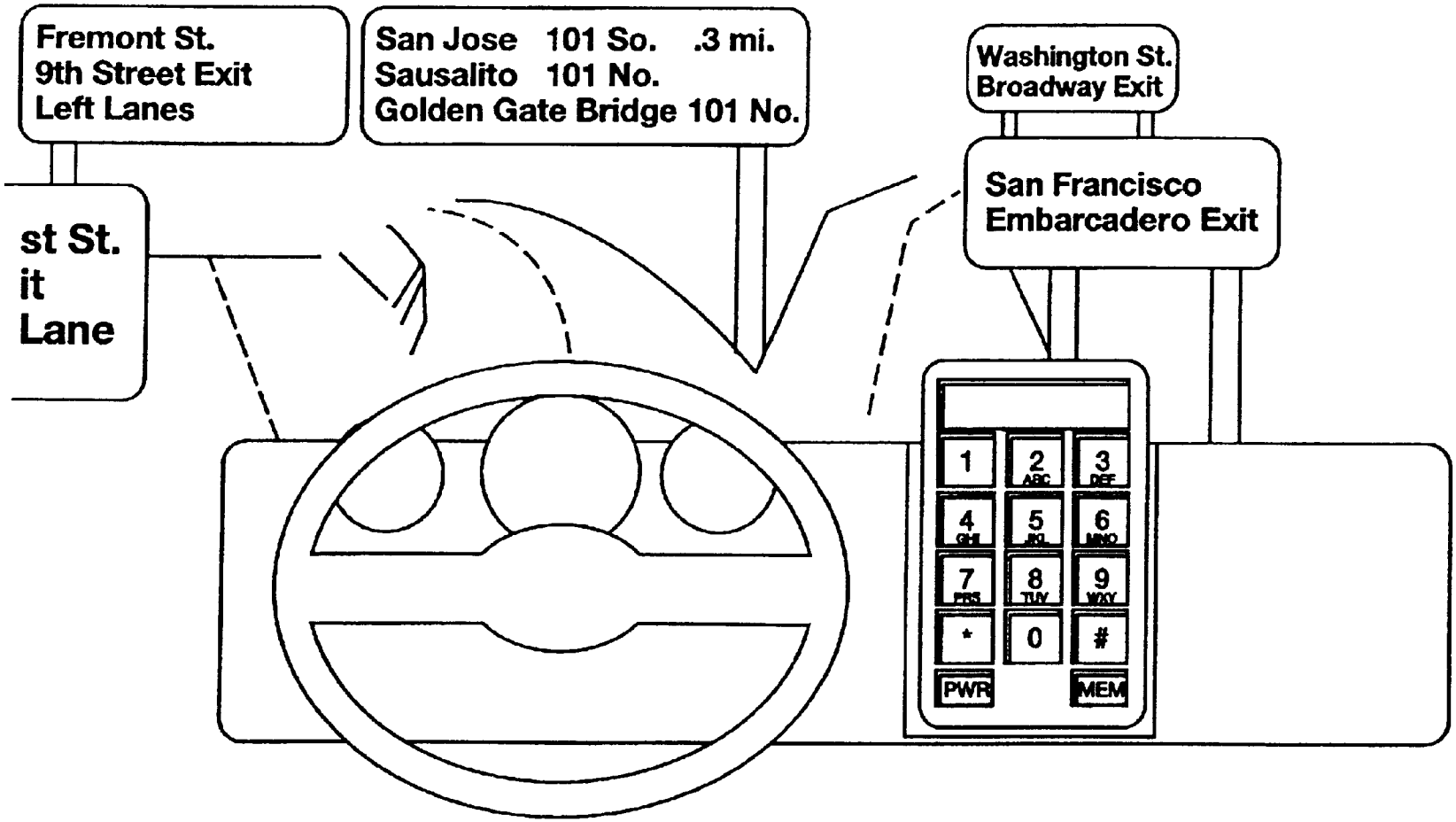
FIG. 5 is a fragmentary representation of a user vehicle equipped with a cellular telephone (or other suitable communicating means) for communicating with the central computer of the invention.
Figure 7:
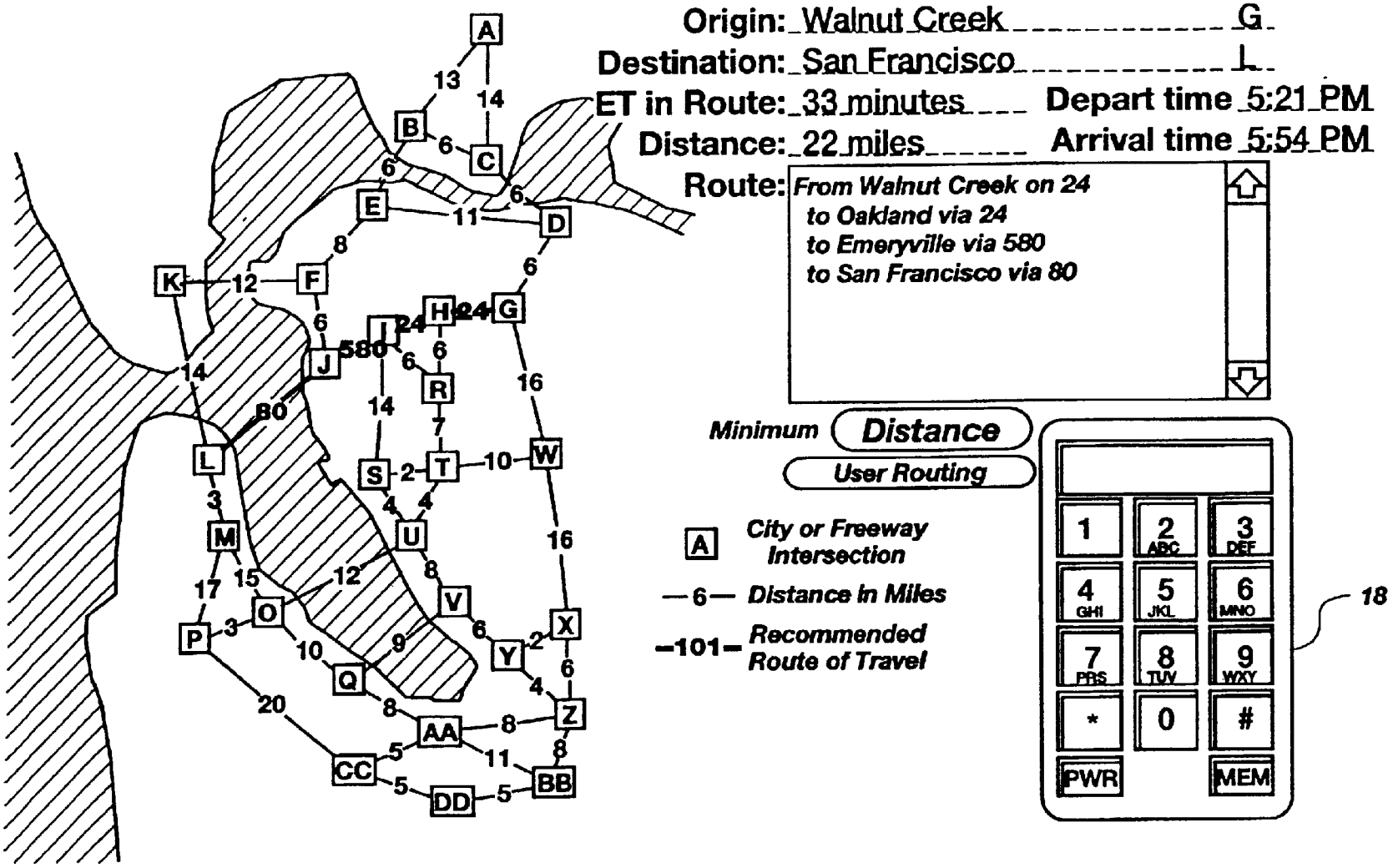
FIG. 7 represents the output of the algorithm in tabular form including origin, destination and recommended route together with a corresponding visual representation of the selected region similar to FIG. 6 but with the particular origin, destination and recommended route being highlighted (or indicated as a darkened line) thereon.

The method of operation contemplated by the present invention is described immediately below with particular reference to FIG. 4.

The method of the invention is believed to be best understood by the following user sequence indicating information conveyed to the central computer by the user and interactions of the computer with the sensors and other means for selecting and conveying to the user a recommended route and estimated minimum travel time between selected points of origin and destination.

An exemplary user sequence is set forth below, assuming that the method of operation and apparatus for the present invention are adapted for telephonic communication between a user, either from a wire-tied telephone or from a mobile device or cellular telephone in the user vehicle, for example.

This example of a user sequence is set forth only for purposes of more completely demonstrating the invention and is not to be considered a further limitation on the method and apparatus of the invention. Furthermore, the exemplary user sequence is described particularly with reference to the schematic illustration in FIG. 4 and also with reference to FIGS. 1 and 2. In that regard, the exemplary user sequence is further contemplated particularly for use within the user region illustrated in those figures. Accordingly, the user sequence refers to specific locations or nodes, numerical route designations, etc. for that particular user region.

Exemplary User Sequence

User Dials: 902(1)

Computer Response: "You have reached traveler information services for the Bay Area. This service provides route recommendations to minimize time in route. Please key in the first letter of the origin city followed by the pound sign (#) and highway number without a prefix or type the highway numbers of the highway intersection nearest your origin. For example, if your origin is Benicia on Interstate 780, type B#780 or type #680#780."(2)

User Dials: The first letter of the city followed by #, then the highway number. For example, the caller's origin is Walnut Creek on highway 24. The caller dials W#24 or 24#680.

Computer Response: The computer acknowledges the caller's input by repeating "Your origin city is Walnut Creek. If that is correct, press 1; if not, press 2."

User Dials: 1.

Computer Response: Computer acknowledges yes by asking: "Place key in the first letter of your destination city, then the # sign and highway number without a prefix, or type the highway numbers of the highway intersection nearest your destination." If there had been more than one city on highway 24 with the first letter W, the computer would ask the user to choose between the cities which the computer would list with first letters starting with W, X or Y.

User Dials: The first letter of the city followed by #, then the highway number. For example, the caller's destination is Sunnyvale on highway 280; the caller dials S#280 or #280#85.

Computer Response: The computer determines that there is more than one city on highway 280 with the first letter S. The computer asks the use to choose between the cities listed with first letters starting with P, R or S. The computer then states, "If your destination is Palo Alto, dial 1; San Mateo, dial 2; Sunnyvale, dial 3."

User Dials: 3.

Computer Response: The computer acknowledges the caller's input by repeating: "Your destination city is Sunnyvale. If that is correct, press 1; if not, press 2."

User Dials: 1.

Computer Response: The computer accesses the minimum elapsed time and route matrix partially illustrated in Tables I and II and tells the user. "The estimated elapsed time to destination is (time stated) and the recommended route is (route stated). If you would like the names of the cities in route, type 1; for points of interest in route, type 2; for hotels, type 3; and for names of off-ramps, type 4."

(1) The user sequence is described employing the dialing code 902 contemplated, for example, for use by occasional users or visitors from other regions. Such users may be less familiar with the particular region, for example, and the computer can be adapted to provide additional detail. Other dialing codes may be employed for other classes of users. For example, another dialing code such as "903" could be employed for commuters who are very familiar with the region. Still another dialing code, for example "904" could be employed for yet another class of drivers such as truckers or drivers of commercial vehicles to provide them with information particularly adapted for their needs. Note that these various dialing codes are also indicated with respective introduction scripts in FIG. 6.

(2) If the computer can not identify the user's anticipated origin and destination combination, the user is asked to repeat the input or to dial for operator assistance if necessary.

Figure 9:
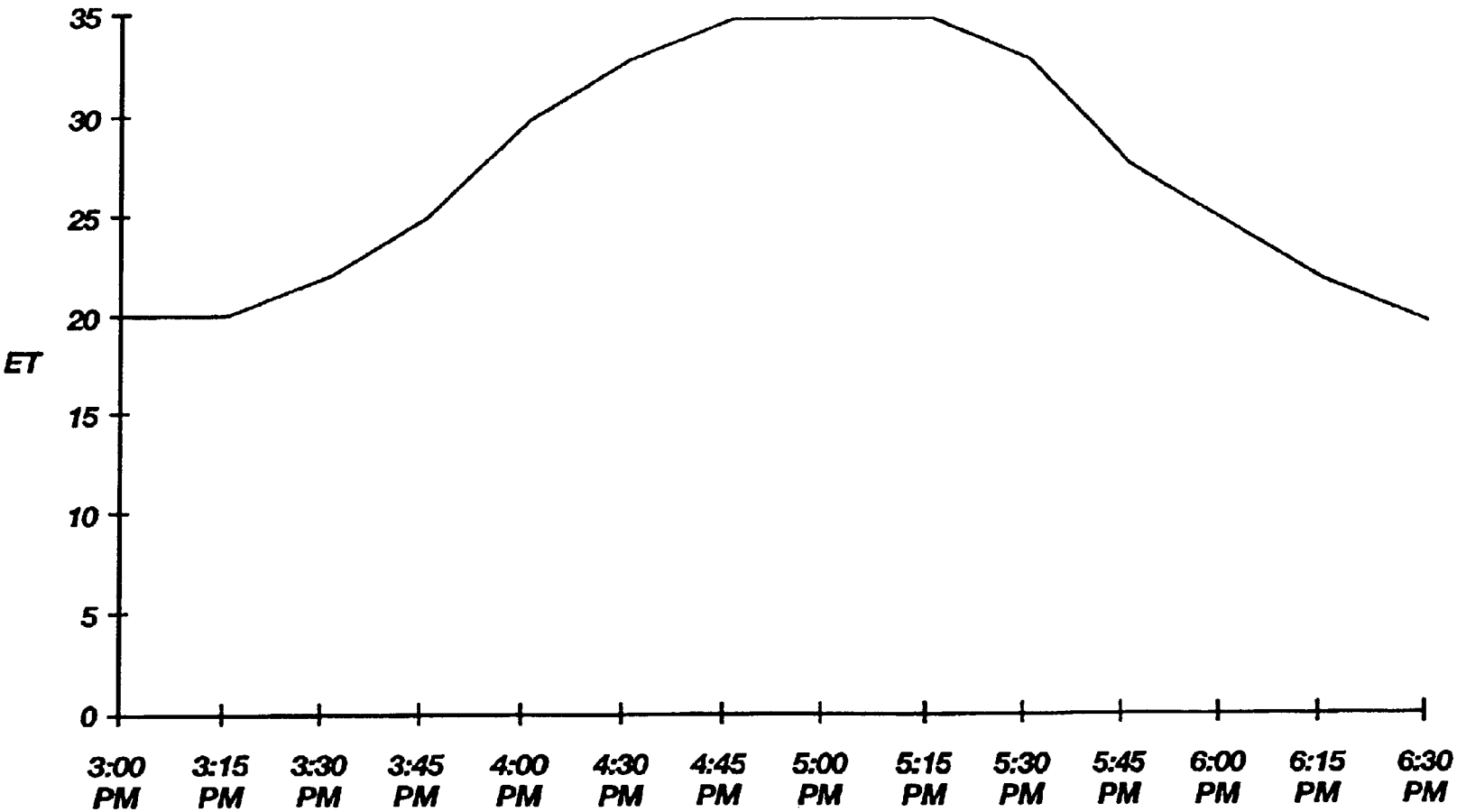
FIG. 9 is a graphical representation of historical data illustrating the change in elapsed travel time as a result of traffic build-up, for different departure times.

NOTE:

a.) The origin for a mobile telephone may be assumed as the then location of the mobile user vehicle assuming it is practical for the cellular phone company computer to identify origins. Alternately, the origin may be determined from a GPS device located on the vehicle or a sensor(tag reader) located adjacent to its path.

b.) Some telephones and some watches have telephone number storage capabilities. Some phones and watches allow a note or a name to be keyed in by repeatedly punching a number and the display change. Phones and pagers have a display that may be utilized in some way including text messaging. These features could be used for example in the user sequence, if available.

c.) An operator may be used just like directory assistance. The operator listens to town of origin and destination and then keys the code on the computer linked map. The computer gives the estimated time in route, etc. with the operator off line in the same way as with directory assistance. This feature is particularly important for a user who is disoriented or unfamiliar with the area. It also overcomes the difficulty of keying information while driving or with restricted lighting. Voice recognition is accommodated since responding B, L, 0 in spelling a cross street can replace keying them. Recognizing Bloomfield as a street without spelling is anticipated.

d.) Note that FIG. 9 illustrates one type of historical data which may be employed for providing more accurate information to the user depending upon the user's contemplated departure time. With such historical information including the velocities recorded by sensor/probe which capture traffic patterns being available, the user could be asked by the computer to indicate departure time if the user is not commencing travel immediately. Then, either for immediate departure or for delayed departure, the computer could factor in historical data of the type illustrated in FIG. 9 in order to provide a more accurate assessment of elapsed travel time and possibly the recommended route. Historical patterns captured make it possible to give different weight to censored and historical information depending on how much in the future it will be used. For a route in progress the censored/probe velocities are probably the most accurate indication of elapsed time near the current position but for a trip that has two hours remaining historical patterns for the end of the trip are the best predictor.

e.) The above user sequence is set forth based upon anticipated use of audio transmission or communication between the user and the central computer. For example, such a communication link could be provided by wire tie telephone or by mobile or cellular telephone as noted above. It is also to be noted that communication between the user and the central computer could employ video and/or data transmission. Suitable video receive/transmitters could be provided in the user vehicle either in the form of a facsimile machine, data display terminal, or even a video screen, similar to a television screen or otherwise. Such video transmitters or receivers would be of particular value since they could specifically display a recommended route for the user and the user could retain that recommended route display for further reference during travel. The GPS logic devise 17 will have the ability to compare waypoints to give information to the user such as video display of current location. The GPS current vs. turn location can provide a countdown to turns to give appropriate audio and/or video notice to the user. Thus, the vehicle user 14 illustrated in FIG. 4 could be provided with such a video transmitter/receiver in place of or in addition to the mobile or cellular telephone indicated at 18.

Table I set forth below illustrates minimum elapsed time between a portion of the origin points and all of the destination points illustrated in the selected user region of FIGS. 1 and 2. In practice, the data illustrated in Table I would be complete for all possible points of origin, as illustrated here, or by performing the calculation for only the requested origin/destination. Which alternative procedure will be used largely depends on computer calculating vs. look-up time.

TABLE I

| | Origin | | | | | | | | | | | | | | |
|---|---|---|---|---|---|---|---|---|---|---|---|---|---|---|---|
| DESTINATION | A | B | C | D | E | F | G | H | I | J | K | L | M | O | P |
| A | 0 | 20 | 24 | 36 | 28 | 41 | 43 | 60 | 56 | 53 | 62 | 67 | 71 | 96 | 100 |
| B | 16 | 0 | 24 | 27 | 8 | 22 | 34 | 43 | 37 | 34 | 42 | 47 | 51 | 77 | 80 |
| C | 25 | 9 | 0 | 12 | 17 | 31 | 19 | 36 | 41 | 43 | 51 | 56 | 60 | 86 | 89 |
| D | 35 | 19 | 10 | 0 | 16 | 30 | 7 | 24 | 29 | 33 | 51 | 47 | 51 | 82 | 89 |
| E | 25 | 9 | 29 | 19 | 0 | 14 | 26 | 35 | 29 | 26 | 34 | 39 | 43 | 69 | 72 |
| F | 37 | 21 | 41 | 31 | 12 | 0 | 34 | 21 | 15 | 12 | 21 | 26 | 30 | 55 | 59 |

TABLE I-continued

| DESTINATION | Origin A | B | C | D | E | F | G | H | I | J | K | L | M | O | P |
|---|---|---|---|---|---|---|---|---|---|---|---|---|---|---|---|
| G | 47 | 31 | 22 | 12 | 28 | 40 | 0 | 17 | 22 | 26 | 60 | 39 | 43 | 69 | 72 |
| H | 60 | 44 | 35 | 25 | 35 | 23 | 13 | 0 | 5 | 9 | 43 | 22 | 26 | 52 | 55 |
| I | 55 | 39 | 41 | 31 | 30 | 18 | 19 | 6 | 0 | 4 | 38 | 18 | 22 | 47 | 51 |
| J | 51 | 35 | 44 | 34 | 26 | 14 | 22 | 9 | 3 | 0 | 34 | 14 | 18 | 43 | 50 |
| K | 61 | 45 | 65 | 55 | 36 | 24 | 58 | 45 | 39 | 36 | 0 | 50 | 54 | 79 | 83 |
| L | 62 | 46 | 55 | 45 | 37 | 25 | 33 | 20 | 14 | 11 | 21 | 0 | 4 | 30 | 33 |
| M | 66 | 50 | 60 | 50 | 42 | 30 | 38 | 24 | 18 | 16 | 26 | 4 | 0 | 26 | 29 |
| O | 88 | 72 | 82 | 72 | 64 | 52 | 60 | 46 | 40 | 38 | 48 | 26 | 22 | 0 | 7 |
| P | 92 | 76 | 86 | 76 | 68 | 56 | 64 | 50 | 44 | 42 | 52 | 30 | 26 | 6 | 0 |
| Q | 108 | 92 | 102 | 92 | 84 | 72 | 80 | 66 | 60 | 58 | 68 | 46 | 42 | 20 | 27 |
| R | 64 | 48 | 43 | 33 | 39 | 27 | 21 | 8 | 9 | 13 | 47 | 27 | 31 | 48 | 55 |
| S | 88 | 72 | 67 | 57 | 63 | 51 | 45 | 32 | 33 | 37 | 71 | 51 | 53 | 31 | 38 |
| T | 85 | 69 | 64 | 54 | 60 | 48 | 42 | 29 | 30 | 34 | 68 | 48 | 52 | 31 | 38 |
| U | 91 | 75 | 70 | 60 | 66 | 54 | 48 | 35 | 36 | 40 | 72 | 50 | 46 | 24 | 31 |
| V | 105 | 89 | 80 | 70 | 85 | 73 | 58 | 54 | 55 | 59 | 82 | 60 | 56 | 34 | 40 |
| W | 71 | 55 | 46 | 36 | 52 | 64 | 24 | 41 | 46 | 50 | 84 | 63 | 67 | 51 | 58 |
| X | 95 | 79 | 70 | 60 | 76 | 88 | 48 | 65 | 70 | 74 | 98 | 4 | 72 | 50 | 56 |
| Y | 97 | 81 | 72 | 62 | 78 | 85 | 50 | 66 | 67 | 71 | 94 | 6 | 68 | 46 | 52 |
| Z | 105 | 89 | 80 | 70 | 86 | 93 | 58 | 74 | 75 | 79 | 102 | 14 | 76 | 54 | 60 |
| AA | 116 | 106 | 91 | 81 | 95 | 83 | 69 | 77 | 71 | 69 | 79 | 25 | 53 | 31 | 38 |
| BB | 117 | 101 | 92 | 82 | 98 | 100 | 70 | 86 | 87 | 86 | 96 | 26 | 70 | 48 | 54 |
| CC | 136 | 120 | 111 | 101 | 115 | 103 | 89 | 97 | 91 | 89 | 99 | 45 | 73 | 51 | 58 |
| DD | 126 | 110 | 101 | 91 | 107 | 109 | 79 | 95 | 96 | 95 | 105 | 35 | 79 | 57 | 63 |

Table II contains generally the same data described above for Table I. In addition, Table II illustrates a recommended routing with minimum elapsed travel time between a given point or origin and point of destination. For example, if a point of origin is assumed to be Cordelia (A) and the destination Belmont (P), then the recommended route is determined by the computer, commencing at the destination and working backwards as illustrated sequentially from P to M, M to L, L to J, J to F, F to E, E to B and B to A. The manner in which the computer selects this particular sequence will be readily apparent from FIGS. 1 and 2, based upon the various interconnecting segments between the nodes intermediate the point of origin, Cordelia (A) and the point of destination, Belmont (P). Table II also illustrates the preferred manner in which an algorithm described in greater detail below, operates to select or determine a minimum route in concentric layers beginning at the destination and working back to the point of origin for each user.

TABLE II

| DESTINATION | Origin A | B | C | D | E | F | G | H | I | J | K | L | M | O | P |
|---|---|---|---|---|---|---|---|---|---|---|---|---|---|---|---|
| A | * | B | C | C | B | B | C | C | B | B | B | B | B | B | B |
| B | A | * | C | C | E | E | C | E | E | E | E | E | E | E | E |
| C | A | B | * | D | B | B | D | D | D | D | B | D | D | D | B |
| D | C | C | C | * | E | E | G | G | G | G | E | G | G | G | G |
| E | B | B | B | D | * | F | D | F | F | F | F | F | F | F | F |
| F | E | E | E | E | E | * | J | J | J | J | K | J | J | J | J |
| G | D | D | D | D | D | H | * | H | H | H | H | H | H | H | H |
| H | G | I | G | G | I | I | G | * | I | I | I | I | I | R | I |
| I | J | J | H | H | J | J | R | H | * | J | J | J | J | J | J |
| J | F | F | I | I | F | F | I | I | I | * | F | L | L | L | L |
| K | F | F | F | F | F | F | F | F | F | F | * | L | L | L | L |
| L | J | J | J | J | J | J | J | J | J | J | K | * | M | M | M |
| M | L | L | L | L | L | L | L | L | L | L | L | L | * | O | P |
| O | M | M | U | U | M | M | U | U | M | M | M | M | M | * | P |
| P | M | M | M | M | M | M | M | M | M | M | M | M | M | O | * |
| Q | V | V | V | V | V | V | V | V | V | V | O | O | O | O | O |
| R | I | I | H | H | I | I | H | H | I | I | I | I | I | T | T |
| S | I | I | T | T | I | I | T | T | I | I | I | I | I | U | U |
| T | R | R | R | R | R | R | R | R | R | R | R | R | R | U | U |
| U | T | S | T | T | S | T | T | T | T | S | S | S | O | O | O |
| V | U | U | U | U | U | U | U | U | U | U | U | U | Q | Q | Q |
| W | G | G | G | G | G | T | G | T | T | T | T | T | T | T | T |
| X | W | W | W | W | W | W | W | W | W | W | Y | Y | Y | Y | Y |
| Y | X | X | X | X | V | V | X | V | V | V | V | X | V | V | V |

TABLE II-continued

| DESTINATION | Origin A | B | C | D | E | F | G | H | I | J | K | L | M | O | P |
|---|---|---|---|---|---|---|---|---|---|---|---|---|---|---|---|
| Z | Y | Y | Y | Y | Y | Y | Y | Y | Y | Y | Y | Y | Y | Y | Y |
| AA | Z | Q | Z | Z | Q | Q | Z | Q | Q | Q | Q | Z | Q | Q | Q |
| BB | Z | Z | Z | Z | Z | Z | Z | Z | Z | Z | AA | Z | AA | AA | DD |
| CC | AA | AA | AA | AA | AA | AA | AA | AA | AA | AA | P | AA | P | P | P |
| DD | BB | BB | BB | BB | BB | BB | BB | BB | BB | BB | CC | BB | CC | CC | CC |

The method and apparatus described above are thus believed to provide a complete disclosure of the invention, particularly with reference to the selected region illustrated in FIG. 1 and elsewhere.

A more detailed example of the method contemplated by the present invention is set forth below, including specific algorithms, etc. for a specific region such as that illustrated in FIGS. 1 and 2. That method is described as follows.

A typical algorithm adapted for use in the central computer is set forth below as an exemplary means of clarifying both the method and apparatus of the present invention as described above.

The algorithms is based on the real time information fed into the sensor table (FIG. 8). In this table, the elapsed times for each of the highway segments are calculated. The raw sensor data represented by S1 and S2 for the highway segment running between node X and node Y will be correlated with actual time of auto probes running between the nodes under various conditions for calibration purposes and correlation equations developed. S1 and S2 will collect not only velocity data but traffic volumes. S1 and S2 may also function as tag readers transmitting the tag number; as a vehicle passes S1 and then passes S2, the central computer calculates velocity. All data will be used in multiple correlation and physical flow models to create the most accurate prediction possible. These equations will be updated as additional data becomes available. Based on these equations, the ETxy and the reverse direction ETyx will be calculated on a continuous basis.

The next step is to calculate the minimum time between nodes. The results of this calculation are shown for the Bay Area in Table I. Please refer to FIG. 3. This figure will be used for the purpose of explaining how minimum elapsed times are calculated. For example, assume E is the destination and F is the origin. The minimum time is min(FE or Min(FHIG,FG)+Min(GBCD,GD)+DE). These letters represent the routes and the sum of the segment times. Minimum is stored in FE. Min for D to E is obtained next as min(DE or Min(DCBG,DG)+Min(GIHF,GF)+FE) and is stored in DE.

The next step is to get the minimum routes for C, G, and H to E. Next solve for GE, its equation is the min(min(GD, GBCD)+DE or min(GF,GIHF)+FE). This is stored in GE. Next solve for CE, the min(CD+DE or CBG+GE). The equations are now getting simpler because the minimum paths have been established for many of the paths to the destination. The second element that helps is that after all the origins to one destination have been determined to Excel or similar spread sheet type programs, the indexing of equations from column to column make the necessary changes automatically except for the first or possibly the second layer of nodes away from the destination.

The next portions is to keep track of the route. This is done by keeping track of the direction from which the minimum path route came. Then the path is figured back to the origin as illustrated in Table II.

The final step of the algorithm provides for adjustment and possible change of the elapsed time and recommended route depending upon historical factors such as traffic build-up represented in FIG. 9 and also set forth below in Table III. Table III includes historical data typically based upon monitoring of traffic velocity over a period of time, preferably weeks, months or even a year in order to accurately assess periods of traffic build-up or decline which can be readily predicted.

In that target, Table III represents historical build-up or decline of traffic particularly during rush hours extending for example from 6:00 a.m. through 9:15 a.m. and from 3:00 p.m. through 6:30 p.m. In Table III, military times are employed to facilitate use of the information by the computer.

TABLE III

| Time of Day | ETxy | F(b) | Time of Day | ETxy | F(b) |
|---|---|---|---|---|---|
| 6:00 | 20 | 1.00 | 15:00 | 20 | 1.00 |
| 6:15 | 20 | 1.00 | 15:15 | 20 | 1.00 |
| 6:30 | 22 | 1.10 | 15:30 | 22 | 1.10 |
| 6:45 | 25 | 1.14 | 15:45 | 25 | 1.14 |
| 7:00 | 30 | 1.20 | 16:00 | 30 | 1.20 |
| 7:15 | 33 | 1.10 | 16:30 | 33 | 1.10 |
| 7:30 | 35 | 1.06 | 16:45 | 35 | 1.06 |
| 7:45 | 35 | 1.00 | 17:00 | 35 | 1.00 |
| 8:00 | 35 | 1.00 | 17:15 | 35 | 1.00 |
| 8:15 | 33 | .94 | 17:30 | 33 | 0.94 |
| 8:30 | 28 | .85 | 17:45 | 28 | 0.85 |
| 8:45 | 25 | .89 | 18:00 | 25 | 0.89 |
| 9:00 | 22 | .88 | 18:15 | 22 | 0.88 |
| 9:15 | 20 | .91 | 18:30 | 20 | 0.91 |
| | | 1.00 | | | |

Table III is thus only one example of historical data which may be employed in the algorithm of the present invention. Other types of historical data may also be employed. For example, predictable time periods of traffic build-up or decline may be predicated upon factors other than rush hour traffic during normal work weeks as represented in Table III. Other types of historical data are provided for holiday schedules and other known events, such as sporting events, tending to have a predictable impact upon traffic flow.

Referring again to Table III, current time, t, may be stored within the computer program or algorithm as a decimal portion of a day corresponding, for example, to the times of day represented in Table III.

Then, adjustment time T=t plus ETxy. Then, if (T>6/24 and >9.25/24,v=round((T*24−6)/4),v=1) or if (T>15 and T<18.5, V=round (((T*24−15)/4+15), V=1). The F(6) from the Vth line of Table III is then used in the equation. F(b) is represented in Table III as a factor relating to the historical build-up or decline of traffic for a particular time. For example, referring to the values of F(b) in Table III, there is no delay factor at 6:00 a.m. or 6:15 a.m. followed by a delay factor from 6:30 a.m. through 7:30 a.m., no delay factor at 7:45 a.m. or 8:00 a.m. and then a decline or negative delay factor from 8:15 a.m. through 9:15 a.m.

Applying the above equation, the estimated time for a given route segment taken from FIG. 1 or FIG. 2 is stated as: ETxy adjusted=ETxy*F(b). In other words, the actual delay function for a recommended route between a selected point of origin and point of destination equals the sum of adjusted ETxy values for all of the route segments selected by the computer between the point or origin and point of destination as described above.

Accordingly, there has been disclosed above a method and apparatus for determining and communicating shortest elapsed time route information to users. Various modifications in addition to those specifically noted above are contemplated by the invention which accordingly is defined only by the following claims which are further exemplary of the invention.

What is claimed:

1. A method for determining and communicating shortest elapsed time route information to users, comprising the steps of:

[individually] *receiving* monitor[ing]*ed* instant rates of vehicular travel on multiple route segments interconnecting various possible origins and destinations, [such monitoring to include the use of] *where said instant rates of travel are monitored using* sensing means, [differential video imaging means wherein a fixed video camera measures rates of travel, Global Positioning System means for measuring movements of a moving vehicle, loop detectors and tag reading devices for reading the passage of tag-bearing vehicles] *the sensing means having the capacity of identifying the presence of the vehicle at more than one location*;

transferring the monitored instant rates of travel for the multiple route segments to a processor [based on the tag readings, the Global Positioning System readings and the loop detector readings which identify the vehicle at more than one location from which said instant rates of vehicular travel are calculated];

receiving information of desired origin and destination in said processor from at least one user[, including vehicle type and number of passengers, such that shortest time route calculation would include all route segments and lanes for which the vehicle has permission to travel];

calculating the route segment or combination of route segments based on the monitored instant rates of travel to provide a shortest elapsed time route between each origin-destination combination; and transmitting information of the shortest elapsed time routes for the origin-destination combination to the [respective] *at least one* user.

2. A method as set forth in claim 1, *wherein the step of receiving monitored instant rates of vehicular travel on multiple route segments interconnecting various possible origins and destinations* includ[ing]*es the additional step of* monitoring the user's trip progress by [Global Positioning System signal] *said sensing means* by recalculating the remaining route continuously using the then-current sensed information [and calling the user if the directions can be improved].

3. A method as set forth in claim 1, wherein the received information of desired origin and destination combination includes an identifier where the *at least one* user can be contacted during the trip.

4. The method of claim 1 wherein the steps of receiving information of desired origin-destination combinations and transmitting information of shortest elapsed time routes for the origin-destination combinations are carried out by [means of] telephone.

5. The method of claim [4] *1* wherein the steps of receiving *information of desired origin-destination combinations* and transmitting information *of shortest elapsed time routes for the origin-destination combinations* are carried out by [means of cellular telephone] *a wireless communication device*.

6. [A] *The* method [as set forth in] *of* claim 1, [including interaction with a user with] *wherein the steps of transmitting and receiving with the at least one user are carried out on* an internet worldwide network[, and wherein web sites are used in place of computers and networks to replace traditional telephone switching systems].

7. The method of claim 1 *wherein the step of receiving information from the at least one user* further compris[ing]*es* [of the step of] receiving information [from the users includes] *of* a contemplated time of departure.

8. The method of claim 1 further comprising the step of collecting historical real time data in the processor to determine normal time variations for the instant rates of travel for the multiple route segments and employing the historical real time data in calculating the shortest elapsed time route between each origin-destination combination.

9. The method of claim 8 further comprising the step of receiving information from the users includes a contemplated time of departure.

10. The method of claim 1 wherein the step of transmitting information *of the shortest elapsed time routes for the origin-destination combination* to the [respective] *at least one* user[s] comprises the transmission of video data *and wherein the shortest elapsed time routes are displayed on a video receiver*.

11. The method of claim 10 further comprising the use of [cellular telephone] *a wireless communication device* for transmitting the information of shortest elapsed time routes for the origin-destination combinations [and providing video receivers for displaying the shortes elapsed time routes to the respective users].

12. The method of claim 1 *the step of calculating the route segment or combination of route segments* further compris[ing]*es* the step of storing data for the shortest elapsed time routes for [each respective] *the at least one* user for a predetermined time and [transmitting updated information of] *periodically recalculating* the shortest elapsed time routes [to] *for* the [respective] *at least one* user[s].

13. The method of claim 1 wherein the step of receiving information from the *at least one* user[s] includes *receiving information on* multiple destinations, the shortest elapsed time routes being calculated for the multiple destinations and transmitted to the [respective] *at least one* user[s].

14. The method of claim 13 further comprising the step of collecting historical real time data in the processor to determine normal time variations for the instant rates of travel for the multiple route segments and employing the historical real time data in calculating the shortest elapsed time route between each origin-destination combination.

15. The method of claim 1 further comprising the step of monitoring instant rates of travel at a plurality of locations along each route segment in order to provide a more accurate calculation of the shortest elapsed time routes for the origin-destination combinations.

*16. The method of claim 1 wherein the sensing means comprises a Global Positioning System for measuring movements of the vehicle.*

*17. The method of claim 1 wherein the sensing means comprises a differential video imager that measures rates of travel.*

*18. The method of claim 1 wherein the sensing means comprises a tag reader for reading the passage of a tag-bearing vehicle.*

*19. The method of claim 1 wherein the sensing means comprises a wireless system that measures the change in location of the vehicle.*

*20. The method of claim 1 wherein the sensing means comprises a Radar System for measuring movements of the vehicle.*

*21. The method of claim 2 wherein the step of recalculating the route segment or combination of route segments based on the monitored instant rates of travel includes the step of recalculating the remaining route continuously based on the monitored trip progress.*

*22. The method of claim 21 wherein the step of transmitting information of the shortest elapsed time routes includes the step of transmitting the recalculated shortest route information to the at least one user.*

*23. The method of claim 1 wherein the received information includes the vehicle type and the shortest time route calculation includes all routes for which the vehicle has permission to travel.*

*24. The method of claim 1 wherein the received information includes the vehicle size such that the shortest time route calculation includes all routes for which the vehicle has permission to travel.*

*25. The method of claim 1 wherein the received information includes the unique and instantaneous requirements of vehicular lane restrictions, and the shortest time route calculation includes all routes for which the vehicle has permission to travel.*

*26. The method of claim 1 wherein the received information includes the number of passengers in the vehicle and the shortest time route calculation includes all lane segments for which the vehicle has permission to travel.*

*27. The method of claim 12 wherein the step of transmitting information to the user includes transmitting updated information to the shortest elapsed time routes to the at least one user.*

*28. The method of claim 1 wherein the monitored instant rates of travel is derived from the volume and occupancy data provided by a single loop sensor.*

*29. The method of claim 1, wherein the steps of transmitting and receiving with the at least one user are carried out by satellite link.*

*30. The method of claim 1, wherein current vehicle location is continuously compared with successive waypoints determined by the shortest elapsed time route calculation.*

*31. The method of claim 30, wherein the difference between the actual and expected time at each of the waypoints forms the basis to inform the at least one user.*

*32. The method of claim 1, wherein voice recognition is used for the purpose of the at least one user communicating the desired origin and destination.*

* * * * *